ized to the mounting post. The entire mount is attached to the post by a connecting bar which in turn holds the horizontal boom. The boom has an arm attached on one end which holds a ball joint for holding a camera tray and handlebar for a full xyz planar movement of the camera. Between the boom and connecting bar are two opposed air springs which are positioned in a cantilevered format so that any vibration which passes from the helicopter seat to the mounting bar is absorbed by the pair of air springs. The air springs are pneumatic and comprised of an inflatable pair of doughnut shaped structures which absorb the vibration and therefore isolates and stops any transmission of vibrations to the boom. The camera is isolated from the foundation's vibrations. The air springs also function to maintain the boom in the generally horizontal position. There are several articulations or adjustments built into this mount so that the cameraman can follow or shoot the assigned scene with very little effort in moving the eye of the camera and the various articulations allows the cameraman an almost infinite amount of angles to focus in on the particular scene. The mount itself can be adapted for use in a land vehicle or strapped onto the back of the cameraman for walking and filming the scene at the same time.

United States Patent [19]
McKay

[11] Patent Number: 4,685,649
[45] Date of Patent: Aug. 11, 1987

[54] VIBRATION ISOLATOR CAMERA MOUNT

[75] Inventor: Scot A. McKay, Canoga Park, Calif.

[73] Assignee: Gregory Gault, Panorama City, Calif.

[21] Appl. No.: 768,911

[22] Filed: Aug. 20, 1985

Related U.S. Application Data

[63] Continuation-in-part of Ser. No. 632,551, Jul. 19, 1984, abandoned.

[51] Int. Cl.⁴ .................. F16M 13/00; F16M 13/04
[52] U.S. Cl. .............................. 248/594; 248/123.1; 248/292.1; 352/243
[58] Field of Search ............... 248/594, 592, 123.1, 248/281.1, 292.1, 593; 352/243; 354/81, 82

[56] References Cited

U.S. PATENT DOCUMENTS

| | | | |
|---|---|---|---|
| 2,156,862 | 5/1939 | Maugard | 248/123.1 |
| 3,044,346 | 7/1962 | Fieux | 248/123.1 |
| 3,352,521 | 11/1967 | Tyler | 248/123 |
| 3,467,350 | 9/1969 | Tyler | 248/179 |
| 4,017,168 | 4/1977 | Brown | 248/586 |
| 4,156,512 | 5/1979 | Brown | 248/123.1 X |
| 4,158,489 | 6/1979 | Gottschalk et al. | 352/243 |
| 4,206,983 | 6/1980 | Nettman et al. | 354/82 X |
| 4,247,067 | 1/1981 | Smith | 248/280.1 X |
| 4,621,786 | 11/1986 | Greenlee | 248/123.1 X |

FOREIGN PATENT DOCUMENTS 2380492  2/1977  France ................. 352/243

OTHER PUBLICATIONS

Greenlee, "Space Ace", Camera Mount for Helicopters brochure.

Body Mount brochure from Continental Camera Systems, Inc.

Primary Examiner—Ramon S. Britts
Assistant Examiner—Karen J. Chotkowski
Attorney, Agent, or Firm—Richard D. Slehofer

[57] ABSTRACT

The vibration isolator and camera mount/instrument mount is mounted on a modified helicopter seat and mounting post. The entire mount is attached to the post by a connecting bar which in turn holds the horizontal boom. The boom has an arm attached on one end which holds a ball joint for holding a camera tray and handlebar for a full xyz planar movement of the camera. Between the boom and connecting bar are two opposed air springs which are positioned in a cantilevered format so that any vibration which passes from the helicopter seat to the mounting bar is absorbed by the pair of air springs. The air springs are pneumatic and comprised of an inflatable pair of doughnut shaped structures which absorb the vibration and therefore isolates and stops any transmission of vibrations to the boom. The camera is isolated from the foundation's vibrations. The air springs also function to maintain the boom in the generally horizontal position. There are several articulations or adjustments built into this mount so that the cameraman can follow or shoot the assigned scene with very little effort in moving the eye of the camera and the various articulations allows the cameraman an almost infinite amount of angles to focus in on the particular scene. The mount itself can be adapted for use in a land vehicle or strapped onto the back of the cameraman for walking and filming the scene at the same time.

10 Claims, 10 Drawing Figures

VIBRATION ISOLATOR CAMERA MOUNT

This application is a continuation-in-part of application Ser. No. 632,551 filed July 19, 1984, now abandoned.

BACKGROUND OF INVENTION

The television and movie industries have increasingly utilized the versatility of a helicopter to film scenes from the air such as vista or panorama views, automobile chases and zoom close-up shots of characters on the ground for added visual effects created by this type of filming. Unfortunately, all helicopters, by their design have a tremendous amount of vibration emitted when the helicopter is in the air, whether it is moving or operating in a stationary hovering position. The turbulence also creates for a non-stable or even a rocking motion of the helicopter while in flight. For example, the swerving back and forth of a helicopter in flight is called yaw or even the pitching of the helicopter which rocks back and forth along its longitudinal axis are problems encountered in actual flight conditions. As a result the cameraman and camera being in the airplane, will correspond with the movement of the helicopter to ruin the camerman's filming sequence. The vertical vibrations inherent in the helicopter is three times that of the horizontal vibration. This is because, as the blades are rotating, the retracting blades stall and create a buffeting effect against the wind as they come around from the back. This is where quite a bit of the vibration is created. Secondly, the pitch of the helicopter blades create a buffeting. The other places where cameras are quite often used is on a moving vehicle to shoot scenes following another car as for example a chase scene or to follow the actors walking over rough terrain where a hydraulic camera mounted boom cannot be used. Either way, the moving vehicle or the following the actors on foot generates vibrations and jerky movements. The movements are transmitted to the camera which results in a fuzzy exposed film, or tape, or a poorly shot scene because of the jerking effect or the vibration caused by the underlying movement of the vehicle or the cameraman. The need was apparent to invent a device which would isolate the movement and to prevent transmission of the vibrations, for example from the helicopter to the camera itself. Hence, the present device was invented to solve these vibration problems.

SUMMARY OF THE INVENTION

The vibration isolator instrument/camera mount is hingedly mounted on a mounting means such as a vertical post or a back pack of some type. A boom has an arm and a camera fully articulated camera tray hanging from one end of the boom. The boom is supported by a connecting brace which connects the other end of the boom to the mounting post. There are two doughnut shaped or double doughnut shaped air springs which are placed between the connecting bar and the boom which is the only connection between the two. All movement or vibration which starts at the mounting post and travels to the connecting bar will be almost entirely dissipated by having these two air springs absorb the vibrations and to isolate the boom and therefore the instrument on the boom from any isolations which have their source in the mounting post. The two air springs and the connecting bar have their axes inclined to the same angle for reducing the overall height of the camera mount and thereby making it a more compact unit. The two air springs are mounted in a cantilevered fashion such that when the horizontal boom is tilted downwardly or there is weight placed on the camera tray, both air springs will compress and when the boom is pivoted or tilted upwardly, both the springs will expand. This added feature tends to keep the boom in a generally horizontal configuration. By adjusting the air pressures of either air spring the generally horizontal attitude of the boom can be changed. The tops and bottoms of each air spring have bolt hole plates for receiving bolts from the various brackets to securely hold the top of the air spring to the connecting bars and the bottoms of the air springs to the boom. The end of the boom has an arm descending therefrom which in turn has a clamp for holding a ball joint having a camera tray attached to the upper end of the ball and a handlebar attached at the lower end of the ball.

There is added versatility in the movement of the boom by means of the pivotal or hinge connection between the camera mount and the mounting post to allow for a tilting of the camera of the entire boom which can be accomplished by pulling down on the handlebars. The boom can be pivoted about the mounting post to allow for a general sweeping of the camera or a given panorama viewing of the scene which can be accomplished by this particular connection. There is also a movable arm at the end of the boom which holds the camera tray. The arm can be rotated about the axis of the boom for raising the level of the camera relative to the cameraman's eye and the arm can be pivoted in a plane parallel with the boom axis as another movement at the disposal of the cameraman. This vibration isolator mount can be used to mount other instruments other than the camera, such as a telescope or gun where the support vehicle transmits vibration to the mount and it is necessary for the accuracy of the instrument to minimize or eliminate any vibrations from passing from the vehicle to the instrument itself. The mount is disclosed and shown as an adjunct for filming from the side door of a helicopter. However, the mount could be a post in a bed of a pick-up truck or a mounting seat of some kind on the roof of a studio car or on a movable telescopic boom attached to a filming car. The mount could be adapted to be supported on a back pack of some type so that the boom could come over the shoulder of the cameraman and the cameraman could shoot while walking to minimize the joustling effect caused when a person walks. The camera isolation mount is useful wherever the supporting vehicle is moving and therefore has vibrations or other types of movements which should not be transmitted to the camera. Otherwise, there would be poor resolution; the clarity of the exposed film or tape is reduced because of the vibration. This vibration is especially prevalent in a helicopter where by the very engineering and design of the helicopter, even when it is hovering or in a stationary position, there is a tremendous amount of vibration. The vibration is transmitted to a camera mount or a cameraman holding a camera free style which results again in a poorly developed film or tape.

In an alternative embodiment of the invention, there is provided a gas spring and an adjustment dial for counterbalancing the weight of the camera when placed on the camera mount. The adjustment dial is at its minimum rotation without any camera mounted on the camera tray. After the camera is placed upon the camera tray, the weight of the camera will cause the boom to tilt downwardly. The preliminary adjustment to the boom causes the boom to be at a generally horizontal attitude with the camera mounted. After this preliminary adjustment, the cameraman is positioned on the seat and then fine tunes the adjustment dial for his own particular preference. The gas spring positioned between the mount and the camera boom functions as a buffer or stabilizer after the adjustment dial has been zeroed in. The compressed gas spring resists up and down pivotal movement of the boom, and the boom will return to its preset position or attitude by the user of the device.

DETAILED DESCRIPTION OF THE PREFERRED EMBODIMENT

Figures 7, 8:
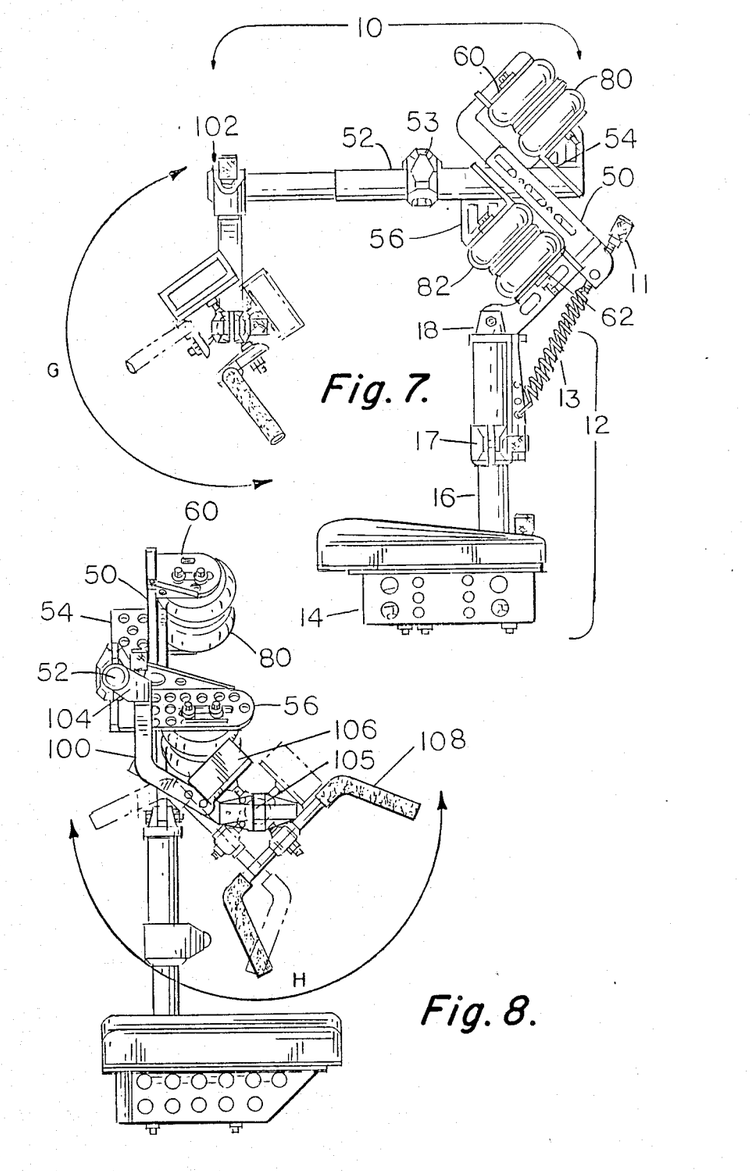
FIG. 7 is a front elevational view showing where the motion of the helicopter is stationary; the boom is stationary, the arm is stationary and the camera tray can be rotated in the vertical plane of the ball point axis along the arc G.
FIG. 8 shows a side elevational view looking into the door of the passenger side indicating that the camera tray can be pivoted in the vertical plane along the arc H.

FIG. 7 is a front elevational view of the vibration isolator camera mount, and the modified helicopter seat with the mounting post. This view is taken as if one were looking through the windshield of the helicopter from the outside. The boom normally projects transversely from the flight path of the helicopter. That is, the cameraman is shooting from the side of the helicopter. FIG. 7 shows the stationary position of the mount without any movements other than illustrating the articulation of the camera mount and tray. In FIG. 7, there are basically two parts to the disclosure. The vibration isolator camera mount is generally described as No. 10.

The mounting means 12 includes the modified helicopter seat 14, vertical mounting post 16 and the hinge means 18 for attachment to the vibration isolator camera mount.

The camera mount generally described as 10 is further described as follows: There is a generally vertical connecting bar 50 which is pivotally attached at one end to the hinge 18 of the mounting means 12. The connecting bar 50 is generally in a slanted configuration to reduce the overall height of the camera mount for allowing use in smaller spaces such as a helicopter cockpit. There is disclosed a generally horizontal boom indicated by No. 52. At the rear of the boom is a first base plate 54 which is welded to the boom 52 at the end of the boom and having a generally 45° rake to the base plate 54. Somewhat forward of this first base plate 54 is a second base plate 56 which corresponds to the first base plate 54 and is also welded to the boom.

Figure 2:
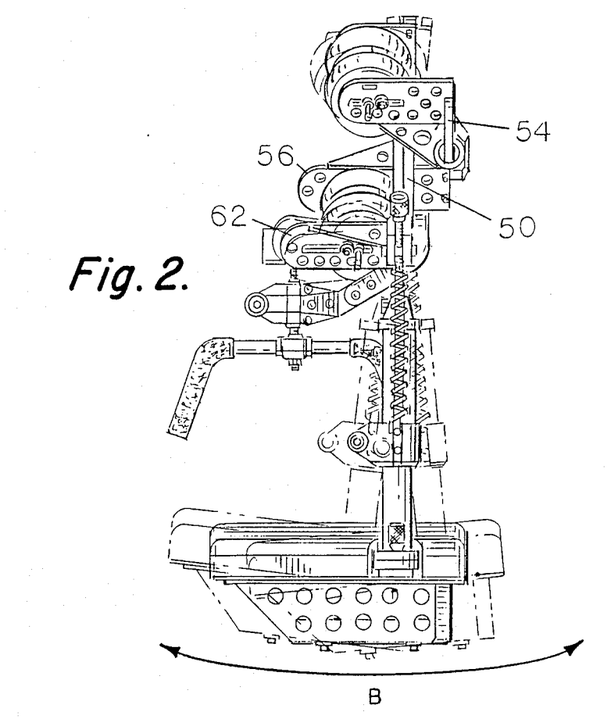
FIG. 2 is a side elevational view taken from the viewpoint of the pilot's eyes and showing in arc B that the movement of the helicopter, when it is pitching back and forth, still allows the steady positioning of the camera tray and camera because the air springs are compensating for the pitch movement of the helicopter.

Referring back now to the connecting bar 50, the upper end of the bar has a first bar bracket 60 welded to its top. The base of the connecting bar 50 has a second bar bracket 62 clearly shown in FIG. 2. The second base plate 56, the second bar bracket 62, the first bar bracket 60, and the first base plate 54 all have bases at the same angle of inclination so that the first air spring 80 and the second air spring 82 are attachable between their respective brackets and also in the same longitudinal attitude as the connecting bar 50. The entire combination here is generally described as a spring means. The first air spring 80 is generally described as a first spring means and the second air spring 82 is generally described as a second air spring means. The axis of the first spring 80, the second spring 82, and the connecting bar 50 are all inclined to the same angle. The first air spring 80 and the second air spring 82 are attached in a cantilevered position. The two air springs are in an opposed relationship so that when the boom 52 is tilted downwardly, both air springs are compressed and when the boom 52 is tilted upwardly, both springs expand to the same extent. The top and bottom to either air spring is identical other than in the sense that the connecting bolts may have a different pattern when it is connected to the bar bracket 60 versus the base plate 54. The air springs 80 and 82 generally have a double doughnut shape with an unrestricted air passage between the two doughnut cavities. The springs are made by Goodyear Tire Company. They are generally described as a super cushion air spring which is a hollow spring having double convolute bellows. The diameter of each doughnut is 3½ inches. There is a pneumatic valve on each spring for applying pressurized air to modify the air pressure within the air springs. The amount of air pressure is generally about 5 lbs., per square inch when there is a 30 to 35 lb., camera mounted on the camera tray. Both air springs are offset from the center of gravity of the mount to correspond with the boom 52 to create a balanced mount when it is attached to the mounting post 16.

The air spring 80 has a top plate which receives bolts from the first bar bracket 60 to secure the connecting bar to the top of the air spring 80. Likewise, the bottom of the spring also has a plate for receiving bolts which are passed through the base plate 54 and are screwed into the bottom of the air spring for securing the spring to the plate. The bottom of the air spring 82 has a plate for receiving bolts passed through the second base plate 56 for securing the bottom of the second air spring 82 to the boom. The top of the second air spring 82 is secured or attached to the second bar bracket 62 by a plate for threadably receiving bolts passed through the second bar bracket 62 for securing the two together.

In another embodiment of this invention, each air spring could be substituted by other damping means such as a helical coil in place of each air spring (not shown), or a helical coil in combination with a shock absorber connecting the base plates and the bar brackets (also not shown).

Now referring to FIG. 8 which shows a side-elevational view of the camera mount as if one were viewing into the door of the passenger side of the helicopter. The horizontal boom 52 is shown from the end view and to this boom 52 is attached an arm 100 which is secured to the end of the boom by a clamping means 102. The clamping means is used to hold the arm in a stationary position. The arm is rotatable about the boom's axis by unloosening the clamp 102 and setting the arm 100 at any angle desired. The arm has a second joint 104 which is more clearly shown in FIG. 5 which allows the arm to be pivoted in a horizontal plane about its axis along the arc E. This joint can be tightened down with a bolt to inhibit the movability of the arm in this arc. Attached to the base of the arm 100 is a ball joint means 105 disclosed as a spherical ball object clamped between two frames to allow universal movement of the camera tray 106 which is attached at one end of the ball joint 105. The ball joint has a camera tray attached at its upper end and a handle bar 108 attached at its lower end so that by moving the handle bars the camera tray will be changed in its attitude correspondingly. Shown in FIG. 8, the camera tray can be pivoted in the vertical plane along the arc H and in FIG. 6 it is indicated that the camera tray can be pivoted in a horizontal plane about its axis along the arc F. The base of the camera is attached to the top of the camera tray as is shown in phantom lines in FIG. 1. The camera used can be a ½ inch video tape camera for example, or a 35 mm camera. The weight of the camera can range upwards of 35 lbs. The tension spring means 13 can be adjusted to compensate for the various weight factors of the cameras used in the shooting sequences. It is forseeable that other instruments could be mounted at the upper end of the ball joint. For example, the camera tray could be modified to act as a mount for a machine gun, or another type of weapon; it could be modified to hold a telescope or even a SLR camera. None of these instruments are disclosed and shown in the drawings but it is to be understood that the application for this mount would be applicable for a wide variety of instruments wherein the sensitivity of the instrument requires isolation of vibrations from the mounting vehicle.

Figure 9:
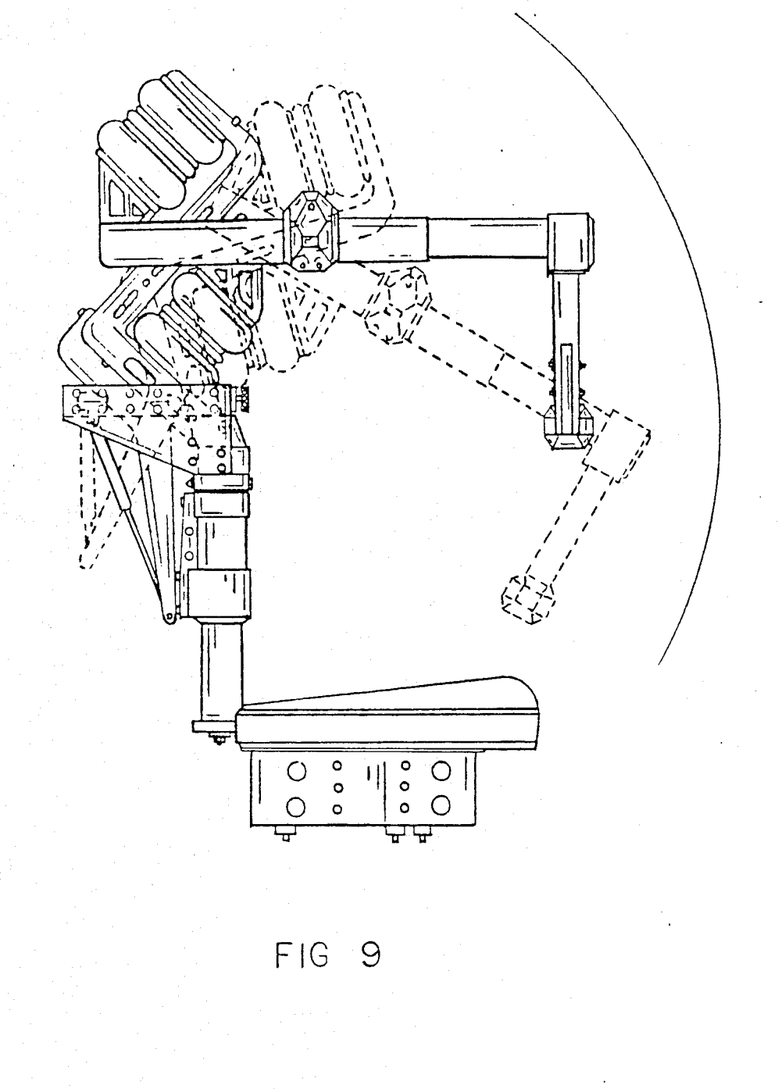
FIG. 9 is a side elevational view of the mount attached to a helicopter seat and illustrating the counterbalancing adjustment from an at rest position to a nearly maximum downward pivot of the boom. This view shows the opposite side of the mount from that shown in FIGS. 1, 3, and 7.
Figure 10:
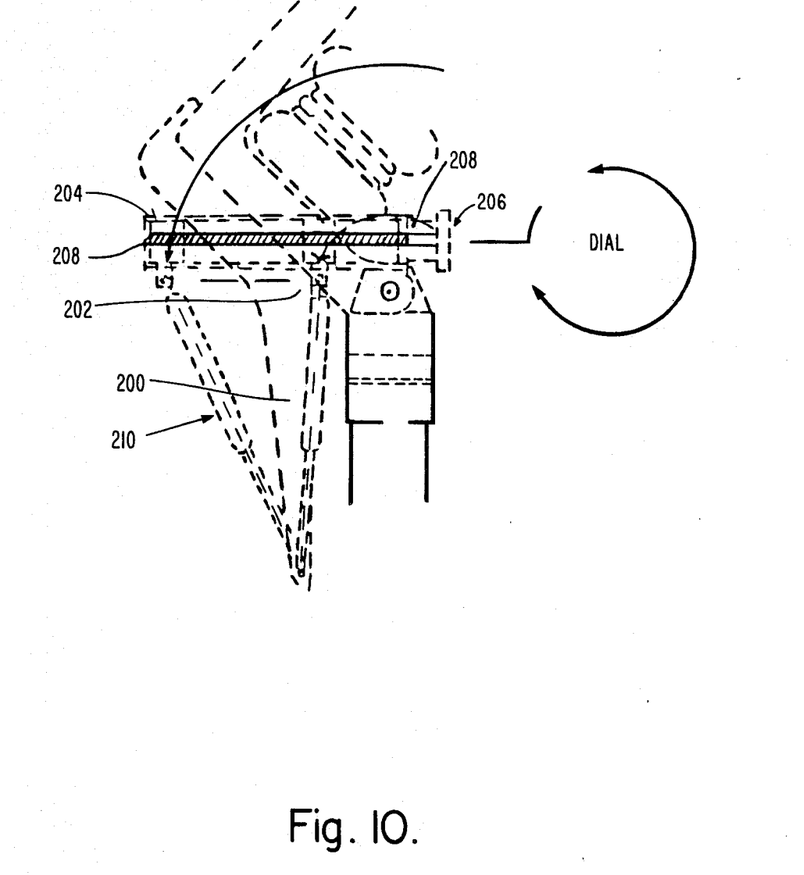
FIG. 10 is an enlarged fragmentary view of the adjustable stabilizer and supportive structure.

FIG. 9 illustrates an alternative embodimant of the invention which utlilizes an adjustable stablizer for counterbalancing the weight of a camera placed upon the camera tray. In the one embodiment, as shown in FIG. 7, there is disclosed a tension spring 13 which is adjustable by rotating a knurled knob 11. These two features are replaced by another type of means as disclosed in FIG. 9 and further enlarged in FIG. 10. There is disclosed a leg 200 attached to the base of the connecting bar 50. There is a brace means, illustrated as a brace 202, being rigidly attached to the mounting post 16. The brace 202 forms a housing and a track for a locator 204 which is a metal block having a threaded whole therethrough. The locator 204 is of such dimension that it can travel on the track of the brace 202. There is illustrated a dial 206 attached to a threaded rod 208, which in turn is meshed with the locator 204. By rotationg the dial counterclockwise or clockwise, the locator will slide back and forth within the confines of this track. The lower end of the leg 200 has a connection means and there is a point at the base of the locator 204 which also has a connection means. Between these two connection means there is attached a gas spring 210. This gas spring is not to be confused with the two air springs 80 and 82. This gas spring 210 replaces the tension spring 13 in this alternative embodiment. The gas spring is a generic term used for this telescoping type of shock absorber. It is made by a company entitled Sacks in the Federal Republic of Germany. The Sacks gas spring contains a type of nitrogen air and fluid so that the gas spring can extend and contract but will only do so under a uniform amount of resistance either in the telescoping, or the extendsion, or the contraction of the spring. One purpose of this adjustable stablizer is to counterbalance the effect of the weight of the camera when placed upon the camera tray.

The resistance to the downward tilting of the boom is modified by the attitude of the gas spring 210 relative to the leg 200, because as the dial 206 rotates the locator 204, the angle between the gas spring 210 and the leg 200 increases. The geometry between the locator 204, the gas spring 210 and the bottom of the leg 200 is such that as the gas spring moves from the vertical towards the horizontal, there is more resistance created on the base of the leg 200. This can be seen in FIG. 10 in phantom lines where the gas spring is at its minimum and its maximum orientation. As can be seen, when the gas spring is at its minimum vertical orientation and, in this case, the adjustment dial will be at its minimum, there is no resistance being placed on the base of the leg 200. The forced relationship is such that when the gas spring is in the vertical orientation, there is no force—very little if any resistance applied to the leg 200 and, accordingly, the pivoting of the leg will be based upon the general distribution of the weight over the pivot mount. In one embodiment, the gas spring 210 could be mounted horizontally and to another lower brace extending from the mounting post. However, it is unneccessary to position the gas spring in the totally horizontal attitude to have the maximum resistance to the pivoting of the boom. However, the gas spring has a limitation on the track length as disclosed in FIG. 10. Within these preactical maximum angular displacements of the gas spring 210 relative to the vertical, it was found sufficient to adjust the added weight ofthe camera tray and this also minimized the space taken up by this counterbalancing brace. The interior of the helicopter is so confining initially that any added features to the camera mount must be very compact to avoid taking up the entire seat space available within a helicopter. However, this is not a critical limitation when the camera is mounted for use in other types of vehicles where the interior space is not critical. In another embodiment not disclosed it could be conceivable that there would be a lower brace attached to the post extending from the post so that there is a space for placement of a gas spring horizontally between the lower mounting post and the bottom of the leg 200.

The weight of the camera or an instrument will cause the boom to pivot downwardly. The boom should be in a generally horizontal position when filming so that the attitude of the boom has to be brought back up to the horizontal position. This is done by turning the dial 206 which in turn causes the locator to go forward or backwards which in turn causes the attitude of the gas spring 210 to go from the vertical to a slanted position. At its maximum slanted position would be the position where there is the most resistance to the leg 200. By turning the dial the boom will rise to a generally horizontal level. This is the zeroing in position for any type of camera to be mounted on the camera tray. In use, the gas spring 210 also functions as a resistance whenever the boom is pivoted on the mounting post by the cameraman. Either pivoting the boom upwardly or downwardly is met with the resistance of the gas spring 210. This built in resistance after the boom has zeroed in causes the boom to go at its at rest position which has been dialed in to be a generally horizontal attitude. At the present, these Sacks gas springs are purchased with a pre-set presssure. A 90-lb. pressure has been found to be appropriate whenever the instrument, such as a camera weighing between 0-17-lbs. A 120-lb. pressure has been found to be appropriate when the camera or instrument weight ranges from 12 to 30-lbs. However, it is foreseeable that one gas spring could have an adjustable air pressure so that the one gas spring would be compatible with any weight of camera and the pressure would be adjusted to correspond with the weight of the instrument on the camera tray.

OPERATION OF THE CAMERA MOUNT

Figure 1:
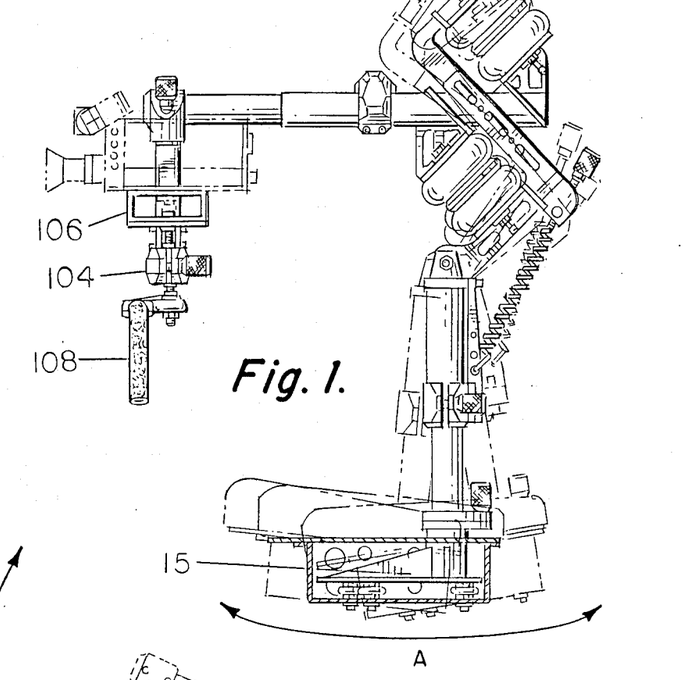
FIG. 1 shows a front elevational view of the camera mount and the modified helicopter seat as if one were looking through the windshield of the helicopter. The boom is projecting from the passenger's door. Arc A indicates that the helicopter has a horizontal vibration when it is airborne causing the helicopter seat to rock back and forth at a high frequency; however, the boom and camera tray remain stationary during this movement because of the absorption of the movement by the air springs. The extent of the movement of the helicopter is exaggerated in the figures.
Figures 3, 6:
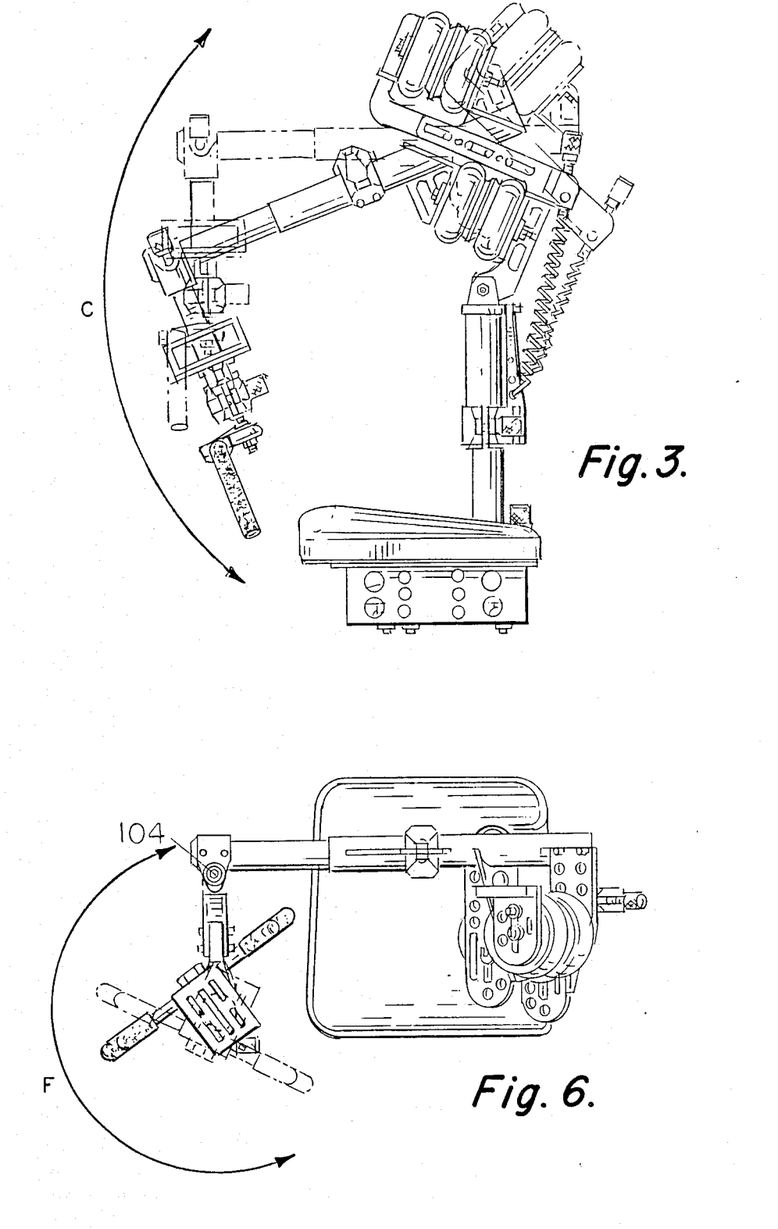
FIG. 3 is another front elevational view of the camera mount indicating by arc C and the arm that the boom and camera tray can be pivoted or reciprocated in a vertical plane.
FIG. 6 shows that when the boom and arm and helicopter movement are stationary, that the camera tray can be pivoted in a horizontal plane about its axis along the arc F.

The mount is constructed so that there will be several axes which provide movement for the cameraman to give him unlimited versatility when positioning the camera or shooting a particular scene while sitting in the helicopter seat. FIG. 1 indicates the pitching or rocking back and forth or vibration of the helicopter seat shown greatly exaggerated in FIGS. 1 and 2. The camera tray, and accordingly the camera, will remain stationary because these vibrations are absorbed by the air springs. FIG. 3 shows the tilting ability of the entire camera mount by the pivotal movement on the hinge 18.

Figure 4:
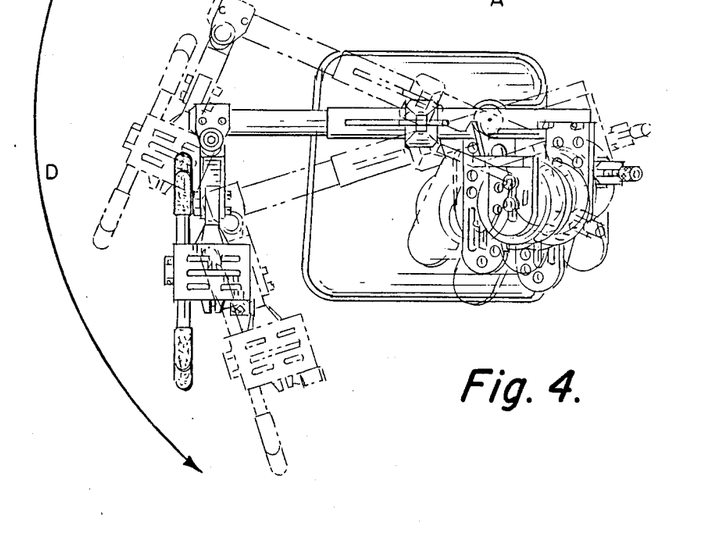
FIG. 4 is a top plan view of the camera mount indicating that the boom and camera tray can be reciprocated in the horizontal plane as indicated by arc D and is accomplished by rotation at the mounting post.

The movement of the boom 52 is shown through the arc C. FIG. 4 is a top plan view illustrating that the entire camera mount can be rotated about the mounting post by means of the rotation clamp 17 which can be loosened to provide this rotation ability.

Figure 5:
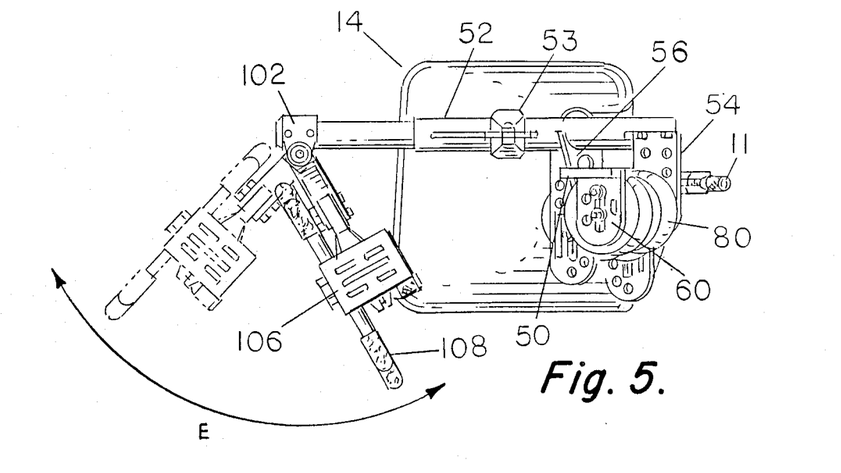
FIG. 5 shows the top plan view where there is pivotal movement of the arm while the boom is stationary as indicated by arc E.

FIG. 5 indicates that the arm 100 can be swung back and forth along the arc E. FIG. 6 indicates that the camera tray 106 be can be pivoted or rotated about the arc F by means of turning the handlebars FIG. 7 indicates that the camera tray can be rotated vertically about the arc G by turning the handlebars and FIG. 8 indicates that the camera tray can again be rotated about the arc H in the z plane. As indicated the camera tray can be rotated in the xyz plane by means of the ball joint combination. The mount can be initially adjusted for a particular cameraman for use. For example, the horizontal boom has a telescopic extension and has a clamp 53 which can be loosened to telescope out the boom to extend it or contract it. As previously stated, the tension spring 13 has the knob 11 which can be turned in or out to adjust the tension between the end of the bar 50 and the mounting post 16. This tension restricts the tilting movement as indicated in FIG. 3 and to counter the weight of the various types of instruments placed on the camera tray. The air pressure and the air springs can be adjusted to modify the amount of the tensioning effect of this device. The spring 13 could be replaced with a hydraulic shock absorber/coil spring combination.

In an alternative embodiment of this tension adjusting means there is illustrated a leveler stablizer in FIGS. 8 and 9. In this embodiment, after the instrument has been placed on the camera, the boom will droop or pivot downwardly because of the weigth of the camera. To counterbalance this effect, the dial length is rotated so that the boom returns to its generally horizontal position. When the cameraman needs to pull down or raise the boom by pushing up or down on the handlebars, he is met with resistance caused by the gas spring. This resistance always causes the boom then to return to its at rest adjusted horizontal postion.

DESCRIPTION OF THE MOUNTING MEANS

FIG. 1 has the base of the seat cut away, the helicopter seat to indicate that there is a brace 15 which acts as a support for the vertical post 16. The helicopter seat disclosed here has the same dimensions as the seat in the passenger side of a helicopter and the original seat can be removed and this modified seat inserted in its place. The camera mount can be used in combination with other mounting means. For example, this type of mount would be very useful when filming from a moving vehicle such as a pick-up or a studio truck of some kind. In this situation the mounting post 16 could be directly bolted to the bed of the pick-up. Again it could be a modified seat bolted into the aforesaid vehicle. Additionally, there could be a modified holster or back pack which would hold the mounting post in some way so that the springs and brace bracket would be behind the walking cameraman and the boom would be projecting over the right shoulder of the cameraman and the arm and the camera tray and the handlebars would be roughly at chest level so that the cameraman could site directly into the view finder of the camera. In effect, this would be a type of articulated camera mount.

The mounting post 16 can be modified to telescope up and down to adjust for varying heights and clearances, especially in different models of helicopters.

While the present invention has been shown and described herein in what is conceived to be the best mode contemplated, it is recognized that departures may be made therefrom within the scope of the invention which is therefore not to be limited to the details disclosed herein, but is to be afforded the full scope of the invention.

What is claimed is:

1. A vibration isolator camera mount apparatus comprising:
   mounting means for mounting a vibration isolator camera mount;
   a generally vertically oriented connecting bar pivotally attached at the lower end to said mounting means;
   a generally horizontal boom having one end positioned near the upper end of said connecting bar, and having means for holding a camera tray at the other end of said boom;

first rubberlike inflatable air spring means and second rubberlike inflatable air spring means for interconnecting said connecting bar with said one end of said boom and for isolating vibrations transmitted from said mounting means to said boom and said camera tray;

first base plate means attached at one end of said boom for securing one end of said first air spring means;

second base plate means attached to said boom inwardly from said first base plate means for securing one end of said second air spring means.

first bar bracket means attached to said upper end of said connecting bar for securing the other end of said first air spring means to said connecting bar; and second bar bracket means attached to said lower end of said connecting bar for securing the other end of said second air spring means to said connecting bar.

2. The vibration isolator camera mount as recited in claim 1 further comprising:

tension spring means connected to said mounting means and said camera mount for compensating for different weight cameras and for adjusting the horizontal attitude of said boom.

3. The camera mount as recited in claim 1, in which the means for holding a camera tray comprises:
 (a) an arm connected to said end of said boom by a clamp means for allowing said arm to be rotatable about the longitudinal axis of said boom, and for allowing a pivotal movement of said arm relative to said clamp means;
 (b) ball joint means attached at the end of said arm opposite that of said clamp means for allowing universal orientation of a camera;
 (c) said ball joint means having a camera tray attached at its top and a handlebar attached at its bottom and coupled to said ball joint means for allowing aiming of the camera by moving said handlebar.

4. The camera mount as recited in claim 3 in which the first and second spring means each comprises:
 (a) an inflatable pneumatic double convolute cylinder bellows type air spring for damping the movement of said boom relative to said connecting bar and for isolating vibrations from said boom caused whenever said mounting means has movement;
 (b) securing means at a top and a said bottom of each said spring means for allowing attachment to each said bar bracket means and said base plate means respectively.

5. The camera mount as recited in claim 1, in which the mounting means for mounting a vibration isolator camera mount comprises:
 (a) a generally vertical post having a hinge means at its upper end for pivotal attachment to said connecting bar;
 (b) at least one support leg extending from the base of said post for keeping the camera mount upright.

6. The camera mount as recited in claim 5 further comprising;

a modified helicopter seat containing said mounting means for allowing a cameraman to sit in said seat while manipulating said handlebar while said camera tray is holding the camera for allowing the cameraman to shoot film while the helicopter is airborne.

7. The camera mount as recited in claim 5 wherein said mounting means comprises:

a receiving means in an automobile for positioning the camera mount in an upright position for allowing the cameraman to shoot film while the vehicle is being driven.

8. The apparatus as recited in claim 1 wherein said boom is telescopic for adjusting the length of said boom.

9. The apparatus as recited in claim 1 wherein said mounting means includes a mounting post having a hinge at its top for attachment to said camera mount, said post being rotatable about a longitudinal axis.

10. The vibration isolator camera mount apparatus as recited in claim 1 further comprising an adjustable stabliizer means attached to said connecting bar for counterbalancing a camera mounted on said means for holding a camera tray:

said adjustable stablizer means including;
 brace means attached to said mounting means for providing a housing and track;
 a locator means positioned in said track for reciprocal movement in said track;
 a dial including a worn gear meshed with said locator for moving said locator within said track of said housing whenever said dial is turned;
 a leg extending downwardly from said connecting bar;
 a gas spring connected at one end to said locator and connected at its other end to said leg;
 said gas spring being extendable and contractable under resistance whenever said mounting means is pivoted up or down.

* * * * *